United States Patent [19]

Yamamoto et al.

[11] 3,896,074
[45] July 22, 1975

[54] ALKYLACRYLATE-ALKANEDIOL METHACRYLATE INTERPOLYMERS AND POUR DEPRESSED COMPOSITIONS THEREOF

[75] Inventors: Roy Isamu Yamamoto, Wappingers Falls; George S. Saines, Fishkill, both of N.Y.

[73] Assignee: Texaco, Inc., New York, N.Y.

[22] Filed: Dec. 6, 1973

[21] Appl. No.: 422,218

Related U.S. Application Data

[62] Division of Ser. No. 309,585, Nov. 24, 1972, Pat. No. 3,817,866.

[52] U.S. Cl. ............ 260/80.81; 252/56; 260/28.5 R
[51] Int. Cl. ............................................. C08f 15/16
[58] Field of Search ...................... 260/86.1 E, 80.81

[56] References Cited
UNITED STATES PATENTS

| | | | |
|---|---|---|---|
| 3,076,792 | 2/1963 | Hollyday et al. | 260/86.1 E |
| 3,238,133 | 3/1966 | Lorensen | 260/86.1 E |
| 3,598,737 | 8/1971 | Van der Meij et al. | 260/86.1 E |

*Primary Examiner*—Harry Wong, Jr.
*Attorney, Agent, or Firm*—T. H. Whaley; C. G. Ries; Robert A. Kulason

[57] ABSTRACT

An interpolymer of an n-alkylacrylate mixture and an n-alkanediol dimethacrylate of from 10 to 18 carbons, said interpolymer having a weight ratio of said n-alkylacrylate mixture to said alkanediol dimethacrylate of between about 99.5:0.5 to 95:5 and a molecular weight between about 3000 and 100,000 and wherein the alkyl in said n-alkyl mix is of at least 18 carbons and at least 70 wt. % of said alkyl is between 20 and 24 carbons inclusively, the $C_{20}$ to $C_{24}$ alkyl group consisting of between about 2 and 65 wt. % of $C_{20}$ alkyl, between about 18 and 65 wt. % $C_{22}$ alkyl and between about 8 and 35 wt. % $C_{24}$ alkyl; and a waxy heavy petroleum fraction containing between 4 and 15 wt. % macrocrystalline paraffin wax having incorporated therein a pour depressing amount of said interpolymer wherein said interpolymer is initially introduced in the waxy heavy petroleum fraction at a temperature above the solution point of the macrocrystalline wax component therein.

2 Claims, No Drawings

ALKYLACRYLATE-ALKANEDIOL METHACRYLATE INTERPOLYMERS AND POUR DEPRESSED COMPOSITIONS THEREOF

This is a division, of application Ser. No. 309,585, filed Nov. 24, 1972 now U.S. Pat. No. 3,817,866 issued June 18, 1974.

BACKGROUND OF THE INVENTION

This invention relates to a novel interpolymer n-alkylacrylate mixture-alkanediol dimethacrylate pour depressor and to macrocrystalline wax containing heavy petroleum fractions of reduced pour point containing said pour depressor.

High wax containing heavy petroleum fraction employed in cold climates or exposed to low temperatures frequently require the use of an additive to maintain their fluidity or to meet critical pour point specifications for the oil for the fraction in question. Additives that are effective for this are called pour depressors. The art discloses numerous classes of pour depressors. One class of commonly used pour depressors are high molecular weight organic compositions prepared by the alkylation of benzene, naphthalene or derivatives thereof and by the polymerization of low molecular weight methacrylates. These common additives have not been found entirely suitable because of their high cost, high concentration required or because they are ineffective in reducing the pour point of macrocrystalline paraffin wax containing heavy petroleum fractions.

Although a wide variey of different pour depressants mentioned above are useful for incorporation in heating oils, fuels, and many other liquid hydrocarbon oils, they have been found generally to be ineffective in decreasing the pour point of paraffinic (macrocrystalline) wax containing heavy petroleum fractions. The poor performance of these additives may result from the structual differences of waxes occurring in the petroleum fractions derived from different locations. It is well known, for example, that acrylate and methacrylate monomers of alkanols having 10 to 20 carbons can be polymerized to make high molecular weight products which are soluble in the heavy petroleum fractions and are generally capable of improving pour points of a variety of fractions. However, with the macrocrystalline wax containing fractions these materials are either ineffective or do not provide the pour point reductions required.

In coassigned, copending application, Ser. No. 250,900, filed May 8, 1972, there is disclosed a poly(n-alkylacrylate) pour depressor which is effective in substantially reducing the pour point of macrocrystalline wax containing heavy petroleum fractions. Although this prior pour depressor functions satisfactorily in reducing the pour point of wax containing heavy petroleum fractions, there is a continuing search for even more effective pour depressors in reducing the pour point of macrocrystalline paraffin wax containing heavy petroleum fractions.

SUMMARY OF INVENTION

We have discovered a novel interpolymer having superior properties in reducing the pour point of macrocrystalline wax containing heavy petroleum fractions and to the heavy petroleum fractions containing the novel pour depressor. More specifically, we have discovered the incorporation of a minor amount of alkanediol dimethacrylate of from 10 to 18 carbons in the polymerization of an n-alkylacrylate mixture, wherein the n-alkyl is of at least 18 carbons and at least 70 wt. % of said n-alkyl is between 20 and 24 carbons inclusively, the $C_{20}$ to $C_{24}$ alkyl group consisting of between about 2 and 65 wt. % of $C_{20}$ alkyl, between 18 and 65 wt. % $C_{22}$ alkyl and between about 8 and 35 wt. % $C_{24}$ alkyl, results in a cross-linked interpolymer which is substantially superior in depressing the pour point of heavy waxy petroleum fractions than interpolymers derived from the n-alkylacrylate mix alone.

DETAILED DESCRIPTION OF THE INVENTION

The interpolymeric pour depressors contemplated are the interpolymers of n-alkylacrylate mixture, an alkanediol dimethacrylate of from 10 to 18 carbons, said interpolymer having a molecular weight between about 3000 and 100,000, (membrane osmometry) preferably between 4000 and 52,000, most preferably between 15,000 and 35,000, said n-alkyl in said mix being of at least 18 carbons, at least 70 wt. % of said n-alkyl being of from 20 to 24 carbons, the $C_{20}$ to $C_{24}$ alkyl group consisting of between about 2 and 65 wt. % $C_{20}$ alkyl, between about 18 and 65 wt. % $C_{22}$ alkyl and between about 8 and 35 wt. % $C_{24}$ alkyl, said alkylacrylate mixture and dimethacrylate monomer components being present in said interpolymer in a weight ratio of between about 99.5:0.5 and 95:5.

The interpolymers are derived from normal bulk polymerization techniques such as polymerizing the alkylacrylate-alkanediol methacrylate monomers in the presence of a free radical polymerization catalyst, e.g., azo catalysts such as azobisisobutyronitrile of U.S. Pat. No. 2,471,959 or the well known peroxide catalyst such as benzoyl peroxide and lauroyl peroxide utilizing catalyst quantities of between about 0.1 and 5 wt. %. Polymerization is normally conducted at a temperature between about 50° and 150°C., preferably between about 80° and 100°C., utilizing a nitrogen blanket to prevent oxidation and free radical catalyst deterioration. During polymerization normal periodic sampling is taken for refractive index (RI) determination. The polymerization reaction is continued until the refractive index remains relatively steady, that is, ±3 units in the fourth decimal place. The reaction time is normally between about 1 and 10 hours.

The n-alkylacrylate mixture employed in the preparation of the pour depressors contemplated herein are prepared by standard esterification techniques through the reaction of an acrylic acid with n-alkanol mixtures wherein the reactive n-alkanols in said mixtures have at least 18 carbons and at least about 70 wt. % of the n-alkanol portion is of from 20 to 24 carbons, the $C_{20}$ to $C_{24}$ group consisting of between about 2 and 65 wt. % eicosanol, between about 18 and 65 wt. % docosanol and between about 8 and 35 wt. % tetracosanol. One suitable source of alcohol mixtures are the alcohols sold under the tradename "Alfols". "Alfols" are impure mixtures containing the major portion, that is, greater than 50 wt. % n-alkanols of various chain lengths, the remainder consisting of hydrocarbon, ketones and hindered unreactive alcohols. Typical analysis of two suitable examples of the "Alfol" alcohols are as follows:

| Typical Properties | Alfol 20+R | Alfol 22+R |
|---|---|---|
| Approx. Homolog distribution 100% basis, wt. % | | |
| $C_{18}$ | 2 | 1 |
| $C_{20}$ | 60 | 5 |
| $C_{22}$ | 20 | 60 |
| $C_{24}$ | 10 | 21 |
| $C_{26}$ | 5 | 9 |
| $C_{28(+)}$ | 3 | 4 |
| Alcohol Content, approx. | 70 | 60 |
| Hydroxyl No. | 123 | 90 |
| Hydroxyl No., 100% alcohol basis | 176 | 150 |
| Sap. No. | 3 | 6 |
| $I_2$ No. | 12 | 13 |
| Carbonyl, % (as C = O) | 0/2 | 0.3 |
| Melting range, °F. | 113–135 | 113–136 |
| Color, Gardner | 12 | 18 |

Examples of the alkanediol dimethacrylate component contemplated herein are the dimethacrylate derivatives of ethylene glycol, 1,2-propylene glycol, 1,3-propylene glycol, 1,6-hexylene glycol, 1,4-octylene glycol and 1,10-decylene glycol.

A standard means of n-alkylacrylate monomer mixture preparation is reacting (esterifying) the alcohol mixture with acrylic acid in the presence of an esterification catalyst such as p-toluene sulfonic acid, desirably in the presence of an azeotroping agent for water by-product removal such as benzene. The esterification is conducted, for example, at a temperature between about 85° and 95°C. and is continued until the amount of water by-product removed as overhead indicates that esterification is essentially complete.

In the compounding of the pour depressed waxy heavy petroleum fractions of the invention, it is essential that the poly(alkylacrylate-alkanediol dimethacrylate) interpolymer pour depressor be introduced into the fraction at a temperature above the solution point of the macrocrystalline paraffin wax component therein. Often temperatures of above 200°F. or more are required for blending. If the interpolymer pour depressor is contacted with waxed component at temperatures substantially below the solution point of a substantial portion of the wax, there is little or no pour depressing effect afforded by the interpolymer.

As heretofore stated, the base petroleum fractions in the compositions contemplated herein have a wax content between 4 and 15 wt. % and a pour point of between 40° and 130°F. The contemplated distillate fractions normally have a boiling point between about 400° and 1100+°F. under atmospheric or reduced pressure, e.g., between about 15 and 760 mm Hg. Specific examples of said fractions are crude oils, residual fuel oils, lubricating oils and vacuum gas oils having the aforementioned properties.

The concentration in which the poly(alkylacrylate-alkanediol methacrylate) interpolymers are incorporated in the petroleum fraction base will be widely varied since it is dependent on the nature and the quality of fraction and the degree of pour depressing required. Pour depressing effect is sometimes evidenced in amounts as small as 0.01 wt. % and quantities of up to about 3 wt. % are usually sufficient. Desirably, the waxy fraction contains between about 0.04 and 0.5 wt. % interpolymer. To facilitate blending of the interpolymer into the petroleum fraction, the interpolymer may be diluted with a solvent such as a light gas oil of a kinematic viscosity (cs) of between about 2 and 4 at 100°F. to form between about 10 and 50 wt. % lube oil concentrate.

The following examples further illustrate the product and composition of the invention but are not to be construed as limitations thereof.

EXAMPLE I

This example illustrates the manufacture of the n-alkylacrylate mixture component utilized in the preparation of the pour depressing interpolymers contemplated herein.

The alcohol utilized in the preparation of the monomers mix herein was designated as Alcohol A and is of the following analysis:

| Typical Properties | Alcohol A |
|---|---|
| Approx. homolog distribution 100% alcohol basis, wt. % | |
| n—$C_{18}$ | 5 |
| n—$C_{20}$ | 39 |
| n—$C_{22}$ | 27 |
| n—$C_{24}$ | 14 |
| n—$C_{26}$ | 7 |
| n—$C_{28}$ | 3 |
| n—$C_{30(+)}$ | 5 |
| n-alkanol Content, wt.% | 70 |
| Hydroxyl No. | 123 |
| Hydroxyl No., 100% alcohol basis | 176 |
| Sap. No. | 3 |
| $I_2$ No. | 12 |
| Carbonyl, % (as C=O) | 0.2 |
| Melting range, °F. | 113–135 |
| Color Gardner | 12 |

To a 3 liter round bottomed flask equipped with an overhead stirrer, trap, condenser, thermometer, heating mantle, nitrogen air inlet but, and drying tubes, there was charged 816 grams of Alcohol A, 487 grams of benzene, 5.6 grams of p-toluenesulfonic acid, 0.44 grams of hydroquinone and 0.44 grams of methylether hydroquinone. The mixture was brought to reflux for one hour while purging with 40 mls./minute of prepurified nitrogen and stirring. Water entrapped in the alcohol in the system was separated and discarded. The mixture was cooled to about 65°C. and 158.4 grams of acrylic acid were added. After bringing the mixture to reflux, ~40 mls.minute of dry air was introduced below the surface of the liquid instead of nitrogen. After 14.5 hours, 29 mls. of water (83% of theory) had been recovered and the reaction was terminated. Nitrogen was again introduced at a rate of 40 mls./minute while the pot temperature was reduced from 97° to 65°C. The reaction mixture was then washed with 150 mls. of water, which was preheated to 65°C., using a stirring speed of about 60 rpm and the mixture was further worked up utilizing a separatory funnel to separate the organic layer. Benzene and residual water from the organic layer was removed by stripping the product to 15 mm Hg pressure at 60°C. A resultant mixture of n-alkylacrylate was recovered in an amount of 882 grams designated as Monoacrylate A and gave the following analysis:

| Physical Data | Mono-Acrylate A |
|---|---|
| Sap. No. | 114 |
| Neut. No. | 1.57 |
| Hydroxyl No. | 8 |
| Ester No. | 112.43 |
| Yield basis OH of alcohol = 137 | 93% |

-Continued

| Physical Data | Mono-Acrylate A |
| --- | --- |
| Sp. Grav., 150°F/50°F. | 0.8349 |
| Kin. Visc., cs. 150°F. | 11.28 |
| 210°F. | 5.92 |
| Melting range, °C. | 32–41°C. |

The percentage distribution of the n-alkylacrylate monomers in Monoacrylate A was essentially the same distribution as the alcohol distribution found in the starting Alcohol A mixture, i.e., about 5 wt. % $C_{18}$ n-alkylacrylate, 39 wt. % $C_{20}$ n-alkylacrylate, 27 wt. % n-$C_{22}$ alkylacrylate, 14 wt. % n-$C_{24}$ alkylacrylate, 7 wt. % $C_{26}$ n-alkylacrylate, 3 wt. % $C_{28}$ n-alkylacrylate and 5 wt. % $C_{30+}$ n-alkylacrylate.

EXAMPLE II

This example illustrates the bulk of polymerization preparation of the interpolymeric pour depressors contemplated herein.

In four separate runs 200 grams of Monoacrylate A of Example I and respectively 2 (Run A), 2 (Run B), 4 (Run C) and 0 (Comparative Run D) grams of dimethacrylate of ethylene glycol were charged to a 1-liter resin kettle equipped with overhead stirrer, condenser, nitrogen inlet tube, thermocouple and constant heat unit. The system was purged with prepurified nitrogen for about 25 minutes utilizing nitrogen rate of 120 mls./minute while heating to 85° ± 1°C. The nitrogen flow as reduced to 30 mls./minute and alpha-alpha'-azobisisobutyronitrile in an amount of 2 grams was added to the kettle. The polymerization was monitored by taking refractive index readings at 54°C at ½ hour intervals. After 1.5 hours the refractive index remained stable indicating completion of polymerization. The reaction was continued for an additional 1.5 hours to verify completion. The products of Runs A, B and C were cooled, analyzed and identified as poly(n-alkylacrylate-ethylene glycol dimethacrylate) interpolymers having an n-alkyl distribution in the interpolymer essentially that of the Alcohol A precursor. The Run D product was identified as poly(n-alkylacrylate) wherein the n-alkyl distribution is that of Alcohol A. The products of Runs A, B, C and D were respectively designated as Polymer A, Polymer B, Polymer C and Polymer D of the following analysis:

EXAMPLE III

This example illustrates the outstanding pour depressing effect in a petroleum fraction of the representative acrylate-methacrylate pour depressors prepared in Example II (Polymer A, B and C) in petroleum fractions and further demonstrates the general pour depressing superiority of the representative acrylate-methacrylate interpolymers over the non-methacrylate containing polymer (Polymer D). The pour points were measured in accordance with ASTM Test D–97 and were measured over a period of 42 to 44 days with intermittent readings in said period. Since pour points do have some degree of variability even within the same samples only those samples evaluated at the same time can be directly compared. Therefore, this accounts for the three following tables and the variations between the tables. Meaningful comparisons must be within each table and not between tables in respect to the pour depressing effect of the representative acrylate-methacrylate interpolymers and the comparative acrylate polymer.

The petroleum base fraction employed was a heavy waxy residual fuel oil comprising 50 vol. % macrocrystalline wax containing vacuum petroleum residuum and 50 vol. % non-waxy hydrotreated gas oil having a boiling point of 400°–652°F., and API Gravity of 35.3 and a pour point of about −5°F. The base fuel composition had the following properties:

| Physical Tests | Results |
| --- | --- |
| Pour Point, °F. | 85 |
| Wax Content, wt. % | 12.7 |
| SUS Visc. at 150°F. | 70.2 |
| API°, Gravity | 24.1 |
| Wt. %, Sulfur | 0.18 |

In the preparation of the pour depressed fuel compositions the vacuum residuum component of the base fuel was heated to 200°F. with stirring for about 0.5 hour during which time the polymers prepared in Example II were added. Subsequently, the hydrotreated gas oil fraction of the base fuel was blended into the mixture at 150°F. followed by stirring at 150°F. for an additional 0.5 hour. The effectiveness of the three representative poly(acrylate-methacrylate) polymers A, B and C and comparative polymer D produced in Exam-

| Test | Polymer A | Polymer B | Polymer C | Polymer D |
| --- | --- | --- | --- | --- |
| Kinematic viscosity | | | | |
| cs at 150°F. | 168.7 | 287.6 | too visc. | 196 |
| 210°F. | 73.5 | 120.0 | — | 81 |
| Melting Point, °C. | 42–44 | 42–44 | 43–44 | 39 |
| Dialysis, wt. % Residue | 49.9 | 57.1 | 58.0 | 42 |
| MW of Dialysis residue (MW by membrane osmometry | 23,700 | 30,500 | 35,000 | 29,000 |
| Melting Point Dialysis Residue, °C | 45–50 | 43–45 | 42–44 | — |
| Sp. Grav., 150°F./60°F. | 0.8605 | 0.8561 | 0.8655 | 0.8580 |
| RI at 54°C. | 1.4531 | 1.4546 | 1.4549 | 1.4545 |
| Component Content, wt. % | | | | |
| n-Alkylacrylate | 99 | 99 | 98 | 100 |
| n-Ethylene Glycol Dimethacrylate | 1 | 1 | 2 | 0 | ple II in depressing the pour point of the waxy petroleum fraction is set forth below in following Tables I, II and III:

TABLE I

| Polymer (Ex. I) | Polymer Conc. Wt. % | Pour Point, °F., after | | | | |
|---|---|---|---|---|---|---|
| | | Avg. | 5 Days | 7 Days | 12 Days | 44 Days |
| Run B Polymer containing 1 wt. % EGDMA* | 0.07 | 35 | 35 | 35 | 25 | 45 |
| | 0.06 | 40 | 30 | 45 | 45 | 45 |
| | 0.05 | 40 | 30 | 40 | 45 | 45 |
| | 0.04 | 45 | 45 | 45 | 45 | 50 |
| | 0.03 | 45 | 35 | 40 | 45 | 65 |
| | 0.02 | 50 | 45 | 50 | 45 | 65 |
| | 0.01 | 65 | 70 | 60 | 65 | 60 |
| Run D Polymer containing 0 wt. % EGDMA* | 0.04 | 50 | 40 | 55 | 50 | 45 |
| | 0.03 | 55 | 45 | 60 | 55 | 65 |

EGDMA = Ethylene Glycol Dimethacrylate

TABLE II

| Polymer (Ex. II) | Polymer Conc. Wt. % | Pour Point, °F., after | | | | |
|---|---|---|---|---|---|---|
| | | Avg. | 3 Days | 7 Days | 17 Days | 28 Days | 42 Days |
| Run A containing 1 wt. % EGDMA* | 0.05 | 40$^+$ | 45 | 35 | 60 | 25 | 40 |
| Run C containing 2 wt. % EGDMA* | 0.05 | 30$^-$ | 40$^+$ | 35 | 30 | 30 | 30 |
| Run D. containing 0 wt. % EGDMA* | 0.05 | 55$^-$ | 45 | 55 | 50 | 70 | 50 |

*EGDMA = Ethylene Glycol Dimethacrylate

TABLE III

| Polymer (Ex. II) | Polymer Conc. Wt. % | Pour Point, °F., after | | | | |
|---|---|---|---|---|---|---|
| | | Avg. | 3 Days | 17 Ays | 28 Days | 42 Days |
| Run A containing 1 wt. % EGDMA* | 0.075 | 35$^+$ | 35 | 40 | 35 | 35 |
| Run C containing 2 wt. % EGDMA* | 0.075 | 35$^+$ | 35 | 55 | 30 | 10 |
| Run D Containing 0 wt. % EGDMA* | 0.075 | 55$^-$ | 45 | 50 | 50 | 55 |

*EGDMA = Ethylene Glycol Dimethacrylate

We claim:

1. A cross-linked interpolymer of an n-alkylacrylate mixture and alkanediol dimethacrylate of a molecular weight between about 3000 and 100,000 (membrane osmometry) wherein the alkanediol dimethacrylate moiety is of from 10 to 18 carbons, said n-alkyl is at least 18 carbons and at least 70 wt. % of said n-alkyl in said mixture is of from 20 to 24 carbons consisting of between about 2 and 65 wt. % $C_{20}$, between about 18 and 65 wt. % $C_{22}$ alkyl and between about 8 and 35 wt. % $C_{24}$ alkyl, said interpolymer having a weight ratio of the n-alkylacrylate mixture moiety to dimethacrylate moiety of between about 99.5:0.5 to 95:5.

2. An interpolymer of claim 1 wherein said alkanediol dimethacrylate is 1,2-ethanediol dimethacrylate and said n-alkyl distribution includes about 39 wt. % $C_{20}$, about 27 wt. % $C_{22}$ and about 14 wt. % $C_{24}$.

* * * * *